(12) United States Patent
Munsil et al.

(10) Patent No.: US 7,561,206 B2
(45) Date of Patent: Jul. 14, 2009

(54) DETECTING PROGRESSIVE VIDEO

(75) Inventors: Donald J. Munsil, Kirkland, WA (US); Stacey Spears, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 717 days.

(21) Appl. No.: 11/171,594

(22) Filed: Jun. 29, 2005

(65) Prior Publication Data

US 2007/0002169 A1    Jan. 4, 2007

(51) Int. Cl.
  *H04N 7/01*   (2006.01)
  *H04N 5/14*   (2006.01)
(52) U.S. Cl. ............................... 348/558; 348/700
(58) Field of Classification Search ........... 348/558, 348/441, 446–448, 451, 452, 699–701; 382/254, 382/284
See application file for complete search history.

(56) References Cited

U.S. PATENT DOCUMENTS

| | | | |
|---|---|---|---|
| 4,980,762 A * | 12/1990 | Heeger et al. | 382/107 |
| 6,055,018 A * | 4/2000 | Swan | 348/448 |
| 6,188,437 B1 | 2/2001 | Webb et al. | |
| 6,239,842 B1 | 5/2001 | Segman | |
| 6,262,773 B1 | 7/2001 | Westerman | |
| 6,618,094 B1 | 9/2003 | De Haan et al. | |
| 6,714,594 B2 * | 3/2004 | Dimitrova et al. | 375/240.16 |
| 6,992,725 B2 * | 1/2006 | Mohsenian | 348/448 |
| 7,362,376 B2 * | 4/2008 | Winger et al. | 348/448 |
| 2002/0149703 A1 | 10/2002 | Adams et al. | |
| 2003/0058268 A1 | 3/2003 | Loui et al. | |
| 2003/0219146 A1 | 11/2003 | Jepson et al. | |
| 2004/0189865 A1 | 9/2004 | Chen et al. | |
| 2006/0244861 A1 * | 11/2006 | Lertrattanapanich et al. | 348/448 |

OTHER PUBLICATIONS

Don Munsil and Stacey Spears, "The Chroma Upsampling Error and The 4:2:0 Interlaced Chroma Problem", Apr. 2001, http://www.hometheaterhifi.com.
Don Munsil and Stacey Spears, "Guide to the Progressive Scan DVD Player Shootouts", Jan. 2003, http://www.hometheaterhifi.com.
Don Munsil and Brian Florian, "Part 5—Progressive Scan DVD", Oct. 2000, http://www.hometheaterhifi.com.

* cited by examiner

*Primary Examiner*—Paulos M Natnael

(57) ABSTRACT

Whether interlaced video fields form a progressive video frame can be automatically determined. The presence or absence of a first characteristic of one or more video fields can be determined by analysis of the fields and/or related information such as flags, cadence, previous determinations, and others. Similarly, the presence or absence of a second characteristic can be detected. In accordance with the detecting, how likely or whether the two or more video fields form a progressive video frame can be determined based on a possibly predetermined likelihood that fields of progressive video frames in general have or do not have the first characteristic and based on a possibly predetermined likelihood that fields of interlaced video frames in general have or do not have the second characteristic.

20 Claims, 11 Drawing Sheets

50　　　　　　　52　　　　　　54
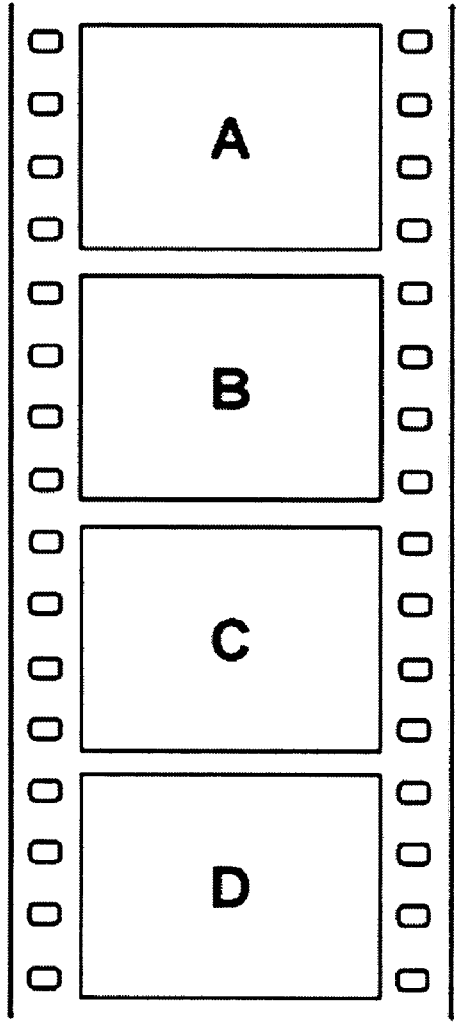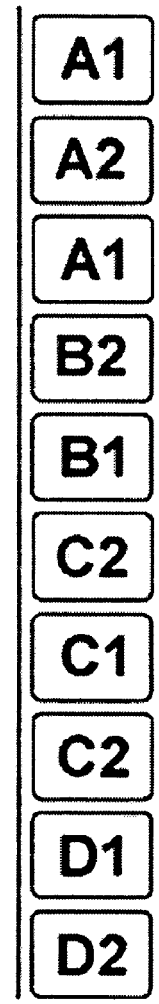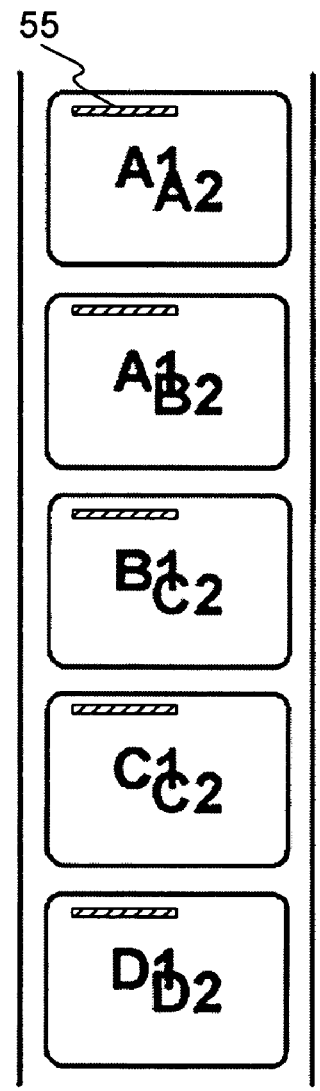
Film → telecine to → Video Fields → display as → Interlaced Frames
RELATED ART
FIG. 1 how often this observation seen or expected in progressive frames/
how often this observation is seen or expected in non-progressive frames

230

| | MPEG Picture | Film Frame | Picture_Structure | Progressive_Frame | Repeat_First_Field | Top_Field_First | |
|---|---|---|---|---|---|---|---|
| 232 | 1 | 1 | Frame | True | True | True | .75/ .2 |
| | 2 | 2 | Frame | True | False | False | |
| | 3 | 3 | Frame | True | True | False | |
| | 4 | 4 | Frame | True | False | True | |
| 234 | 1 | 1 | Top Field | False | False | False | .95/ .16 |
| | 2 | 1 | Bottom Field | False | False | False | |
| | 3 | 1 | Top Field | False | False | False | |
| | 4 | 2 | Bottom Field | False | False | False | |
| | 5 | 2 | Top Field | False | False | False | |
| | 6 | 3 | Bottom Field | False | False | False | |
| | 7 | 3 | Top Field | False | False | False | |
| | 8 | 3 | Bottom Field | False | False | False | |
| | 9 | 4 | Top Field | False | False | False | |
| | 10 | 4 | Bottom Field | False | False | False | |
| 236 | 1 | 1 | Frame | False | False | True | .87/ .05 |
| | 2 | 1 & 2 | Frame | False | False | True | |
| | 3 | 2 & 3 | Frame | False | False | True | |
| | 4 | 3 | Frame | False | False | True | |
| | 5 | 4 | Frame | False | False | True | |

| prev frame | current frame | next frame | how often progressive | how often not progressive |
|---|---|---|---|---|
| t | t | t | .9 | .05 |
| t | t | f | .92 | .15 |
| t | f | t | etc. | etc. |
| t | f | f | | |
| f | t | t | | |
| f | t | f | | |
| f | f | t | | |
| f | f | f | | |

FIG. 10

DETECTING PROGRESSIVE VIDEO

BACKGROUND

The two most common types of video are interlaced video and non-interlaced or progressive video. In progressive video sequences, each frame of video data is a complete picture (e.g., 480 scan lines) and will usually be displayed all at one time. In interlaced video sequences, each frame of video data represents, alternatively, the odd lines of an image (e.g., 1, 3, ... 479), or the even lines of an image (e.g., 2, 4, ... 480). When interlaced video is displayed, odd lines are displayed, and then even lines are displayed, and so on. A frame of odd numbered lines is referred to as an odd field, and a frame of even numbered lines is referred to as an even field.

Interlaced video works well with an end-to-end analog system where an analog camera signal is transmitted in analog form and displayed by an analog television. However, modern displays and televisions may need to perform various digital processing operations such as image scaling. Furthermore, modern display technologies like LCD, DLP, LCOS, and plasma are natively progressive and thus interlaced video must be deinterlaced and converted into a progressive form in order to scale or perform other operations. Interlaced video can't be scaled without creating severe artifacts and so it must be deinterlaced first. In some cases such as with high resolution CRTs, in order to improve image quality interlaced video will be deinterlaced, scaled up, and then reinterlaced so it can be displayed as high resolution interlaced video, for example 1080i. All this requires deinterlacing.

FIG. 1 shows how a progressive source can be converted to and displayed as interlaced video. A progressive source 50 such as film, computer generated graphics, progressive-captured video, etc. is converted to video fields 52 using telecine (television-cinema) conversion, for example. Telecine conversion takes a single frame of the progressive source 50 and divides it into an odd field and an even field. An extra field may be inserted for every other source frame to increase the frame rate, e.g., from 24 frames-per-second (fps) film to 60 fps interlaced video. Referring to FIG. 1, frame A is converted to odd field A1 and even field A2. Field A1 is repeated. Frame B is converted to odd field B1 and even field B2, and so on. The effect is that each source frame is converted to 3 fields, then 2 fields, then 3 fields, etc., thus producing 10 fields (5 frames) for every 4 progressive/film input frames. This is often called 3-2 pulldown. The interlaced video fields 52 may be displayed as interlaced frames 54, for example on an interlaced display. In this case, odd field A1 is displayed on the odd lines of the display, then even field A2 is displayed on the even lines of the display, and so on.

As discussed in detail later, interlaced video frames 54 may also have flags 55 that may indicate properties of the frames 54 and/or the fields therein. For example, in the case of MPEG2, SMPTE VC1, and MPEG4 AVC (H.264), video, flags 55 may include: a repeat flag indicating whether a field is to be repeated; a progressive flag indicating whether the two fields in a frame go together to form a progressive picture (i.e., is from a progressive source); a top flag indicating whether the top (odd) field in a frame goes first; a "repeat first field" flag indicating to a decoder that after the first and second field of a frame are outputted the first field should be outputted again—if the "repeat first field" is not true then only the first field and second field are outputted; etc.

Other encoding schemes are somewhat similar in concept to 3-2 pulldown but may vary in cadence, frame rates, etc. For example, 2-2-2-4 and 2-3-3-2 are used for DV Cam. There is also 3-2-3-2-2 which is used for Varispeed to speed up presentation and squeeze an extra 30 second commercial into a 30 minute show. There are also 5-5, 8-8, 8-7 and 6-4 which are used for animated material such as Japanese anime. While 3-2, 2-2-2-4, 2-3-3-2, and 3-2-3-2-2 all cover 24 frame per second progressive content, 5-5 is for 12 frames per second. Sometimes 2-2 pulldown is used, which is 30 frames per second in the US and 25 frames per second in Europe. Embodiments in the Detailed Description can be tailored for any current or future type of encoding profile or scheme FIG. 2 shows interlaced video 54 converted to progressive video 56. Often there is a need to convert interlaced video to progressive video by combining odd fields with corresponding even fields to produce a complete progressive image for display. For example, some displays are only capable of displaying progressive video. Furthermore, progressive video is often brighter and sharper than interlaced video and may also have fewer visible artifacts.

To avoid confusion of terminology, it should be noted that at least in the case of MPEG2, or SMPTE VC1, or MPEG4 AVC (H.264), the output of the decoding process, for interlaced sequences, comprises a series of reconstructed fields that are separated in time by a field period. The two fields of a frame may be coded separately as field pictures. Alternatively the two fields may be coded together as a frame, sometimes called a frame picture. Both frame pictures and field pictures may be used in a single video sequence.

How difficult it is to combine an odd field with an even field, and the quality of an image so produced, depends significantly on whether the odd field and even field are actually from a same single original progressive image or frame. If an odd field and an even field are from a same progressive source then they may be combined with a trivial weave or union operation. For example, in the case of a 480 line display image or area, an odd frame having lines 1, 3, ..., 479 is combined with an even frame having lines 2, 4, ..., 480, to produce a complete progressive frame with lines 1, 2, 3, 4 ... 479, 480. Referring again to FIG. 2, field A1 and field A2 are combined to form progressive frame A, which may be repeated as needed to achieve an appropriate frame rate. Frames B, C, etc. may be similarly reconstituted and possibly repeated. This form of deinterlacing is sometimes called inverse telecine.

If the odd and even fields of interlaced video are not from the same image (i.e., the source is not progressive) then likely their image data was captured at different times (e.g., with an interlaced camera) and most likely cannot be merged as simply as in the case of fields of a progressive source image. In this case, so called video deinterlacing may be used. Video deinterlacing may involve a wide variety of simple to sophisticated image processing algorithms which in effect produce an interpolation, average, etc. of the odd and even field. Video deinterlacing using image processing is difficult because when some objects in a field are stationary and some are moving there is no perfect way to deinterlace; two fields of a same frame do not represent a single real world snapshot and cannot be combined perfectly. Most approaches generally involve interpolation to fill in missing information. Video deinterlacing inherently produces imperfect images.

In sum, interlaced video from a progressive source can and should be deinterlaced by weaving fields, and true interlaced video may if necessary be deinterlaced using imperfect video deinterlacing.

It is important to apply the appropriate form of deinterlacing for any given interlaced video sequence. If two fields are from a progressive source and form a natural progressive image then, as discussed above, it is easy and preferable to deinterlace them using simple weaving. Furthermore, if those progressive-source fields are mischaracterized as interlaced video and are subjected to video deinterlacing, then severe visual artifacts will result. Similarly, if two fields are truly interlaced and do not form a progressive frame then they should be deinterlaced using video deinterlacing. As discussed below with reference to FIG. 3, there are some imperfect techniques for identifying progressive-source video.

FIG. 3 shows a system 70 that deinterlaces video. System 70 could be a DVD player, a media application on a computer, a deinterlace device either coupleable inline before a display or television or incorporated in a display or television, etc., in the form of hardware or software or both. System 70 may receive interlaced video 72 that was encoded from a progressive source 74, or it may receive interlaced video 76 that is from an interlaced source 78. If system 70 is to produce deinterlaced video, as discussed above it is preferable to directly unite odd and even fields that are from a progressive image. Therefore, system 70 has a detector 80 to detect whether fields form a progressive frame. If the detector 80 detects a progressive frame then the fields are deinterlaced by a weaving-type deinterlacer 82. If the detector does not detect a progressive frame, then the fields are deinterlaced by a video deinterlacer 84.

The detector 80 may employ a number of well known techniques for detecting progressive fields (fields whose odd/even partner are from a same progressive source or image). However, these techniques sometimes fail to identify progressive fields and sometimes mistakenly identify non-progressive fields as progressive.

One such technique is flag analysis—analyzing the repeat-first field, top-field-first, and/or progressive-frame flags in a video stream. Flag analysis may work if the video has been correctly encoded. However, flags are often not set correctly and their values differ from the true nature of the video with which they are associated. For example, progressive frames may have their progressive flags set to false. Flags errors can result from human error during the encoding process. Many MPEG encoders introduce flag errors on chapter breaks because they insert chapter breaks after encoding and re-encode the areas around the chapter breaks, which causes errors. Errors can also occur in shows edited with systems that ignore the 3-2 pattern because they were designed to edit video. There are many scenarios where flags are not set correctly and the progressive nature of video cannot be detected by flag analysis. Furthermore, flag analysis usually requires access to the actual compressed stream, but a stand alone chip in a television, for example, may not have access to the compressed stream.

Another technique for identifying progressive video is cadence analysis. Cadence analysis involves comparing the image data of fields (e.g. with image analysis) to find fields that are effectively equal, and then looking at the cadence of equal fields (e.g. 323232) to spot telecine encoding of a progressive source. Referring to FIG. 1, a cadence analyzer might recognize that the first A1 field is equal to the third field/frame which is also A1. Cadence analysis avoids the problem of non-standard or missing flags but can fail when the cadence is irregular or unexpected, or when noise makes field matching unreliable.

In sum, it is difficult to use one technique to reliably determine, for many different interlaced video streams and sources, whether fields are from a progressive source and form a progressive frame or whether the fields are truly interlaced (i.e., their lines were not captured at the same time).

SUMMARY

The following summary is included only to introduce some concepts discussed in the Detailed Description below. This Summary is not comprehensive and is not intended to delineate the scope of protectable subject matter.

Whether interlaced video fields form a progressive video frame can be automatically determined. The presence or absence of a first characteristic of one or more video fields can be determined by analysis of the fields and/or related information such as flags, cadence, previous determinations, and others. Similarly, the presence or absence of a second characteristic can be detected. In accordance with the detecting, how likely or whether the two or more video fields form a progressive video frame can be determined based on a predetermined likelihood that fields of progressive video frames in general have or do not have the first characteristic and based on a predetermined likelihood that fields of progressive video frames in general have or do not have the second characteristic.

Many of the attendant features will be more readily appreciated by referring to the following detailed description considered in connection with the accompanying drawings.

DESCRIPTION OF THE DRAWINGS

FIG. 1 shows how a progressive source can be converted to and displayed as interlaced video.

FIG. 9 shows a pattern table with flag patterns and corresponding probabilities that the patterns are found in progressive or non-progressive frames.

FIG. 10 shows another flag pattern.

Like reference numerals are used to designate like parts in the accompanying Drawings.

DETAILED DESCRIPTION

Figure 2:
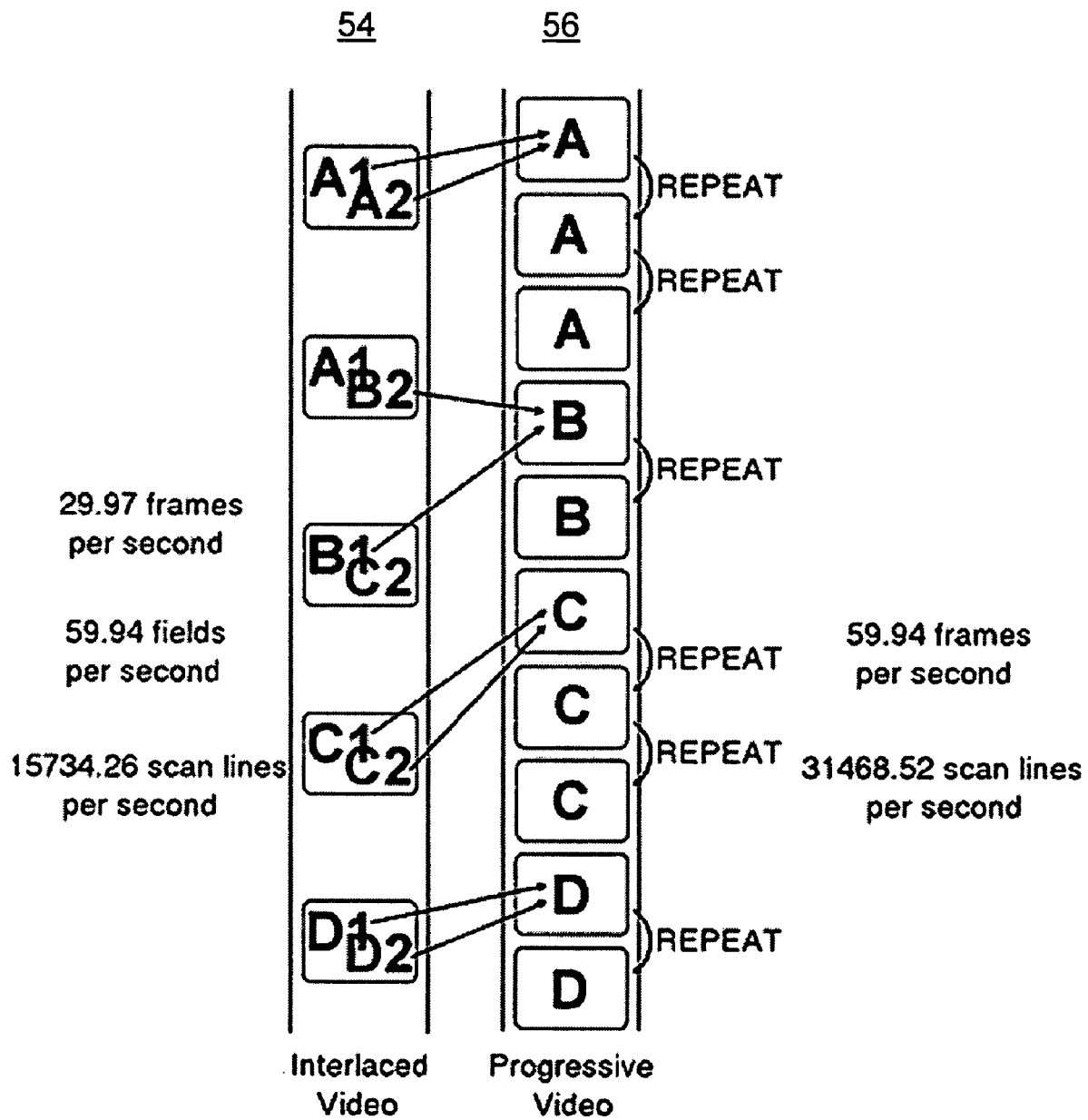
FIG. 2 shows interlaced video converted to progressive video.
Figure 3:
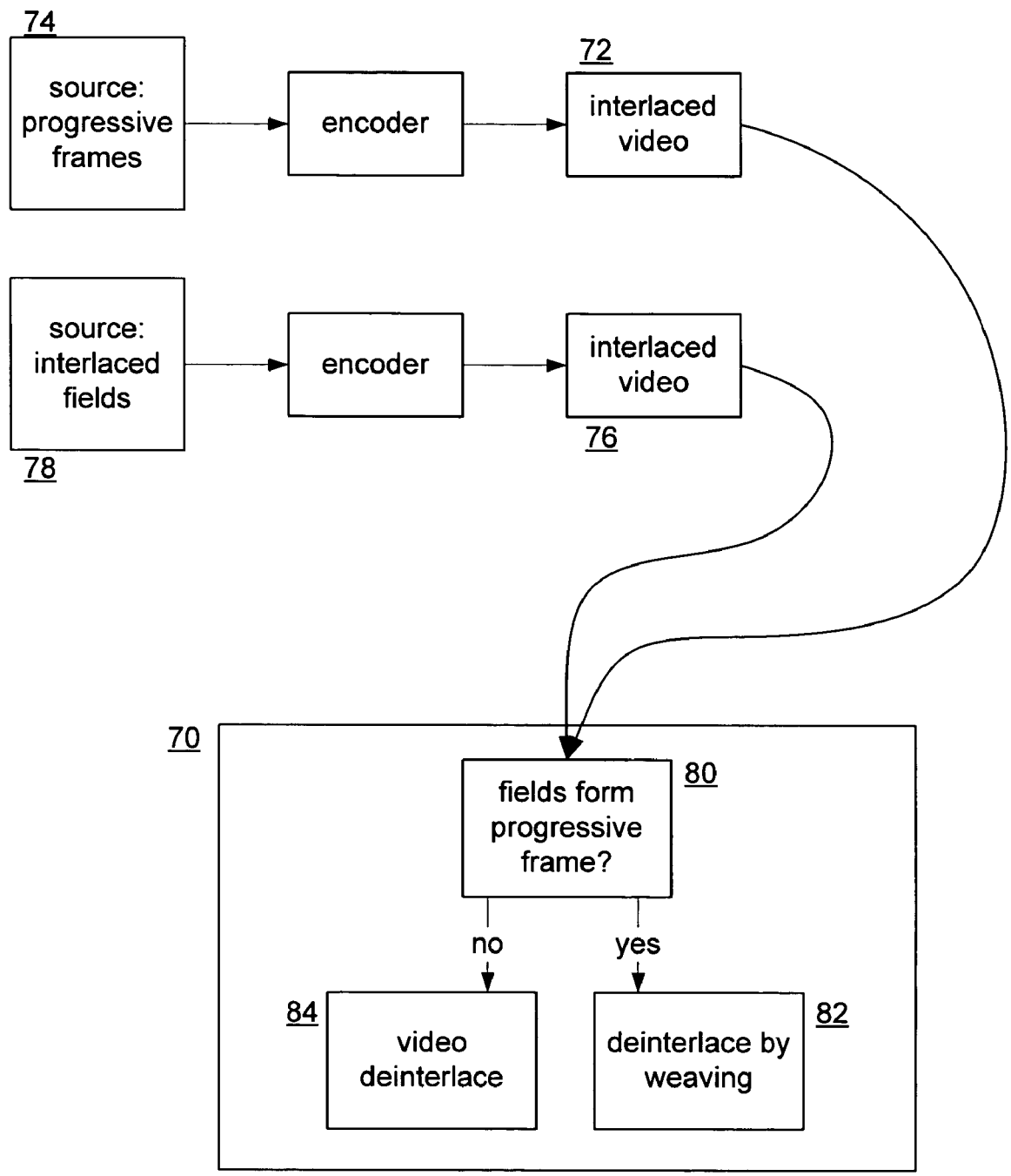
FIG. 3 shows a system that deinterlaces video.
Figure 4:
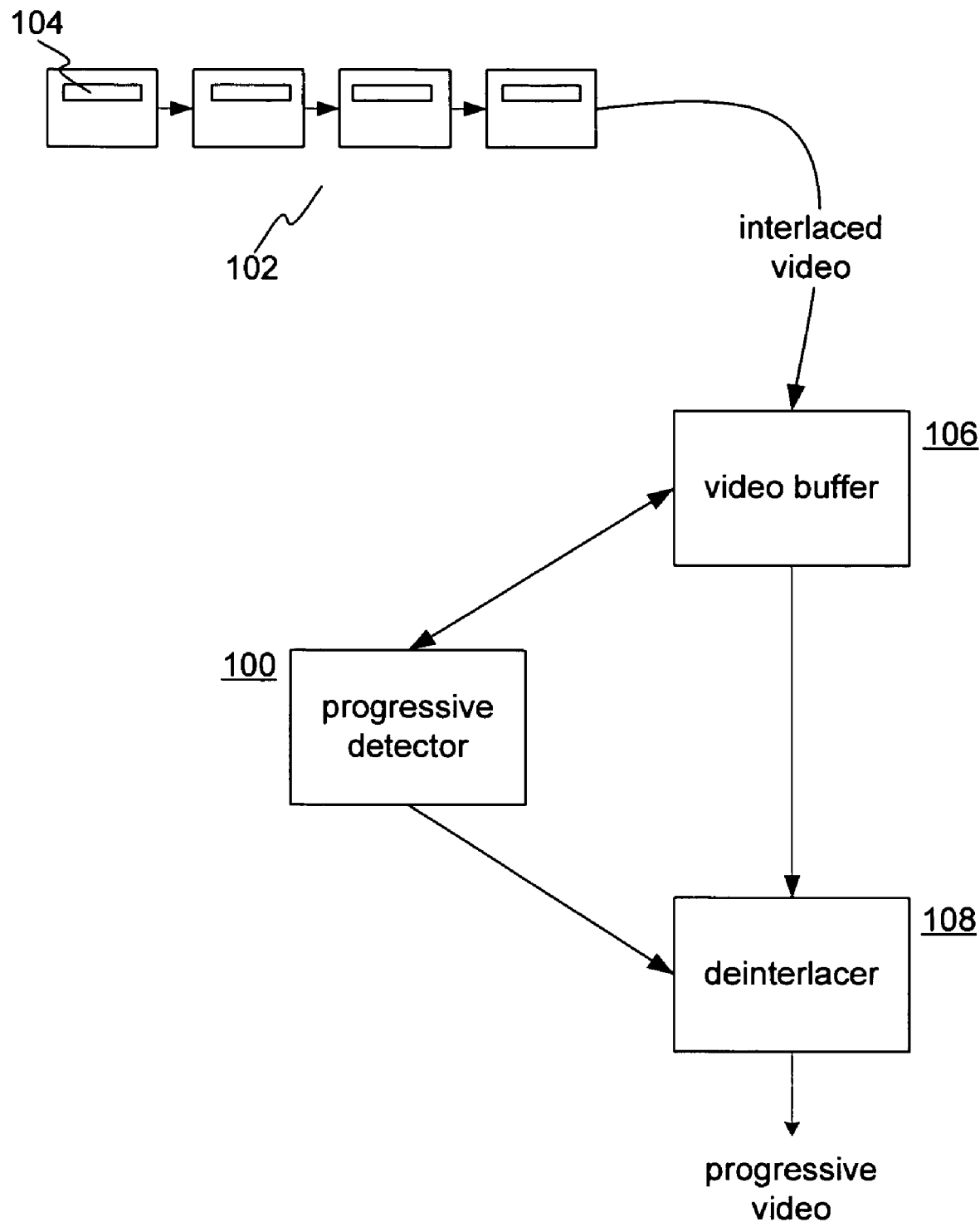
FIG. 4 shows a setting for a progressive detector.

FIG. 4 shows a setting for a progressive detector 100. Interlaced video frames or fields 102 possibly having flags 104 are received by a video buffer 106. The video buffer 106 temporarily holds a rolling short sequence of fields 102 which the progressive detector 100 accesses and analyzes before they are passed to a deinterlacer 108. The progressive detector 100 analyzes the progressivity of fields in the video buffer 106 and sends to the deinterlacer 108 a control signal that indicates to the deinterlacer 108 whether the fields 102 coming in or leaving the video buffer 106 form progressive frames or whether they are true interlaced fields. According to the control signal, the deinterlacer 108 may perform simple weave-type deinterlacing or it may perform video deinterlacing (or even no deinterlacing).

Figure 5:
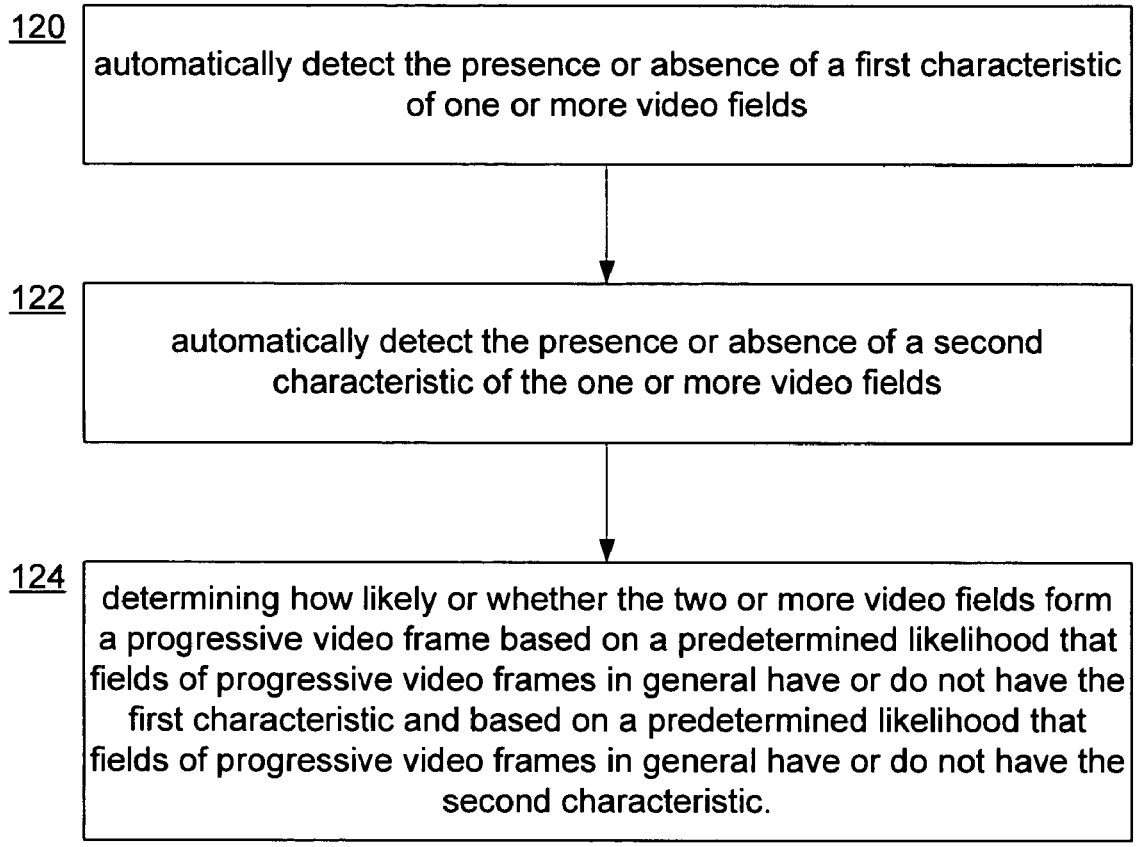
FIG. 5 shows a process that may be performed by a progressive detector.

FIG. 5 shows a process that may be performed by progressive detector 100. The presence or absence of a first characteristic of one or more video fields is detected 120. The presence or absence of a second characteristic of one or more video fields is detected 122. The progressive detector 100 may determine 124 how likely or whether the one or more video fields form a progressive video frame based on a predetermined likelihood that fields of progressive video frames in general have or do not have the first characteristic and based on a predetermined likelihood that fields of progressive video frames in general have or do not have the second characteristic. The video field characteristics may be detected in fields in the video buffer 106. Alternatively or additionally, the video field characteristics may be detected using historical detection data, as discussed further below.

Figure 6:
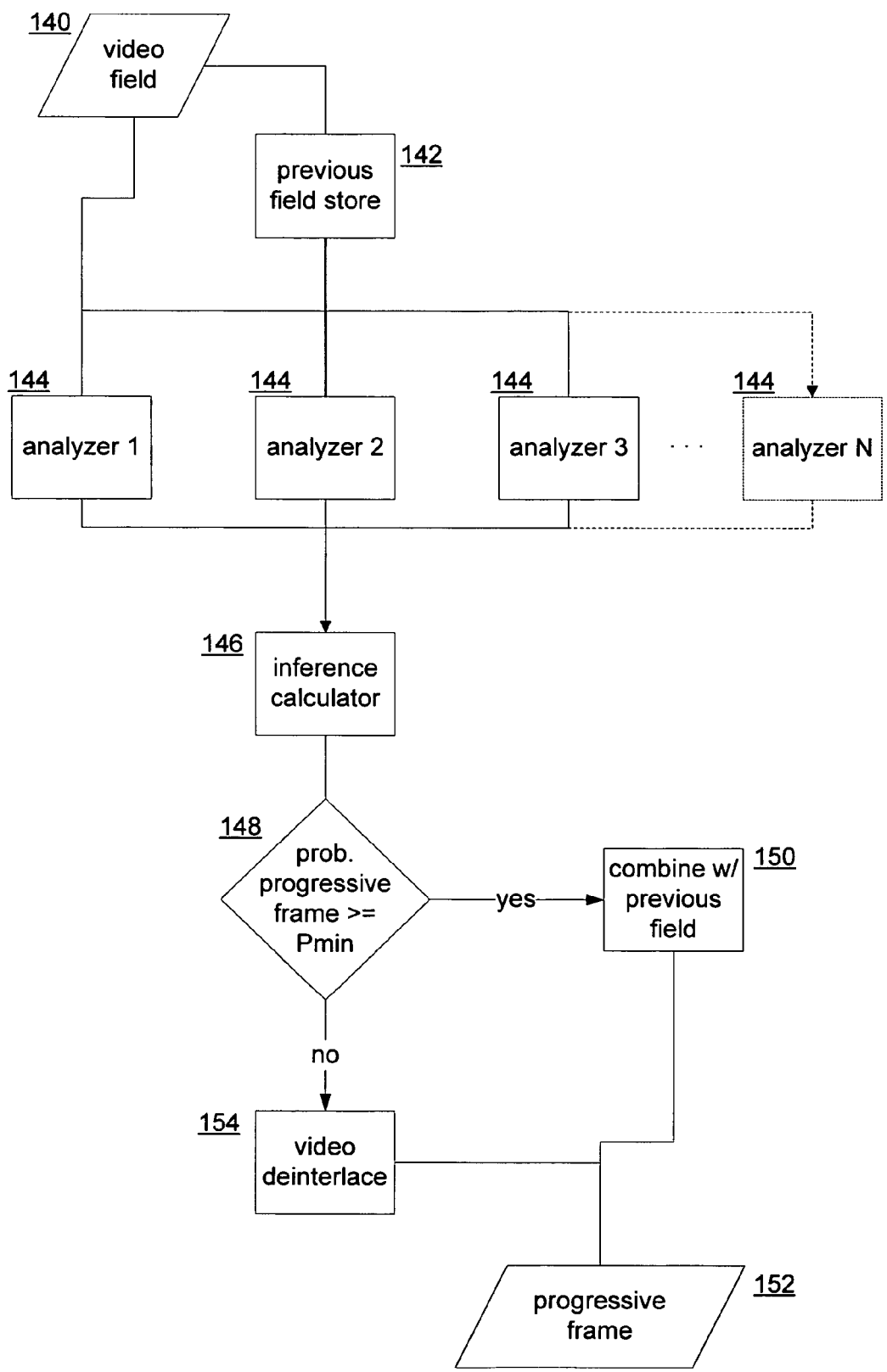
FIG. 6 shows a system for detecting fields that form progressive frames.

FIG. 6 shows a system for detecting fields that form progressive frames. An incoming field 140 may go to a previous field store 142 and a series of analyzers 144. The analyzers 144 may analyze the current field 140 and/or the previous field to observe a fact about the field(s) 140. The observed fact may be used to output from the analyzer 144 probabilistic information such as a frequency, a ratio, a probability, etc. with which the observed fact accompanies progressive video in general. For example, an analyzer 144 may analyze the values of certain flags in the field(s) under consideration and may determine that the flags match a certain flag pattern. The analyzer 144 may have a predefined statistic such as a percentage of a population of progressive video that has the certain flag pattern (the observed fact or characteristic or feature of the video), or a general probability of observing the type of fact given a progressive source. The analyzers 144 output probabilistic information such as different a priori probabilities that progressive or non-progressive video in general will have the attributes or facts observed by the analyzers 144. Various types of analyzers 144 will be discussed later with reference to FIGS. 8-10.

An inference calculator 146 receives the probabilistic observations from the analyzers 144 and uses them to calculate a total probability that the field(s) under consideration are progressive. If 148 the probability is greater than a minimum probability Pmin, then the fields are combined 150 and output as a progressive frame 152. If 148 the probability is not greater than Pmin, then the fields are deemed non-progressive and are combined by video deinterlacing 154 and output as a progressive frame 152.

The inference calculator 146 may be implemented in any number of ways. Preferably a Bayesian calculation is performed. The probabilistic information output by the analyzers 144 is well suited for a Bayesian calculation, particularly a naïve Bayesian calculation. A Bayesian inference tree may also be used, however this requires some additional information about how the outputs of the analyzers 146 are interdependent. Other techniques may be used, such as fuzzy logic, intelligent weighted averages, and so on. Details of a Bayesian inference calculator will be discussed later with reference to FIG. 11.

Figure 7:
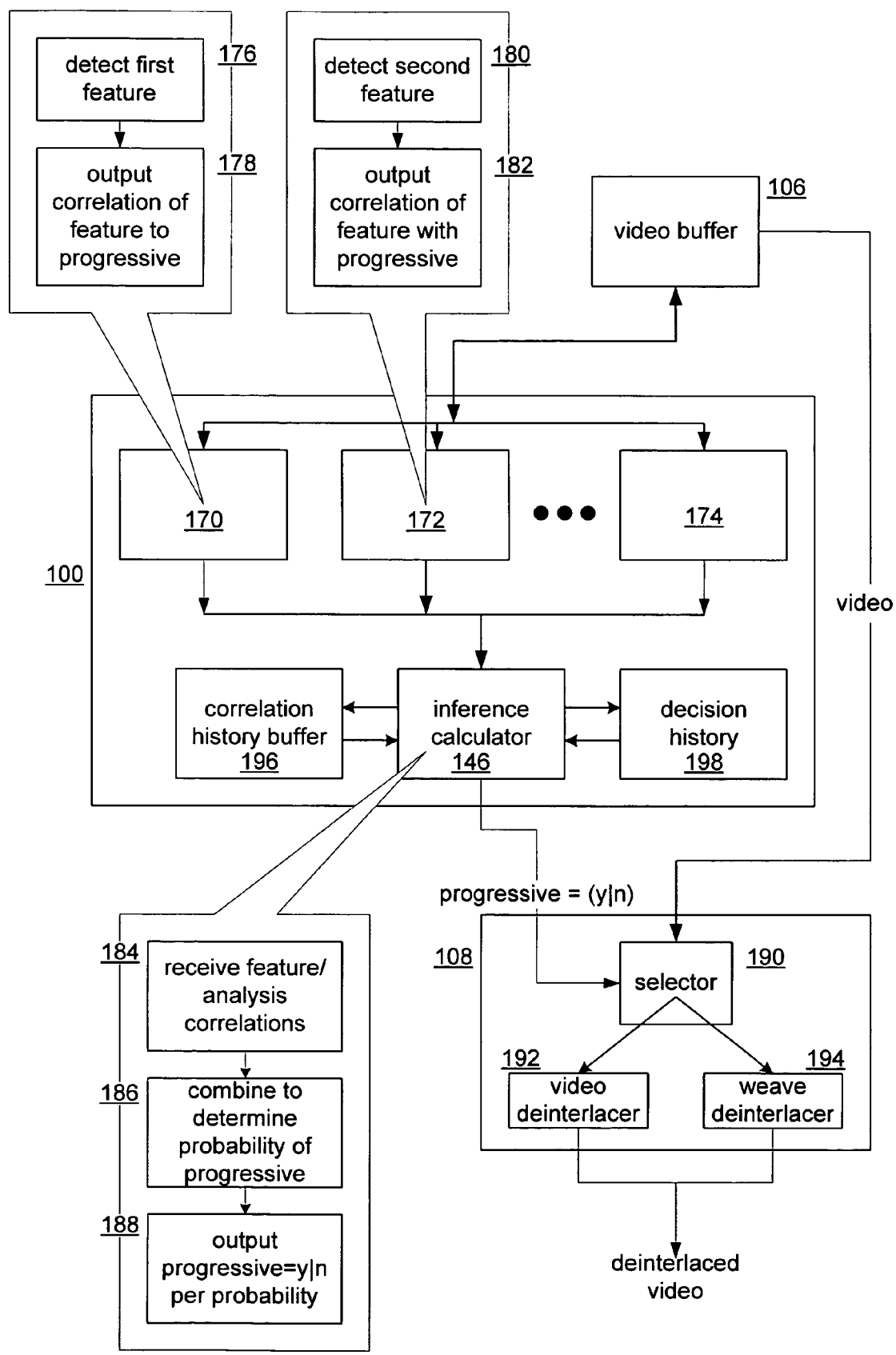
FIG. 7 shows another embodiment of a system for detecting progressive video.

FIG. 7 shows another embodiment of a system for detecting progressive video. Again, a progressive video detector 100 analyzes video in a video buffer 106 before the video in the video buffer 106 is deinterlaced by a deinterlacing unit 108. A number of analyzers 144/170, 144/172, 144/174 parse the interlaced fields in the video buffer 106. As discussed later with reference to FIG. 8, the analyzers 170, 172, 174 each perform a different type of analysis, such as flag analysis, cadence analysis, combing analysis, historical analysis, frequency analysis, etc.

Analyzer 170 detects 176 the presence of a first feature of the interlaced fields. The analyzer 170 then outputs a degree of correlation of that first feature with progressive video. For example, analyzer 170 may compare a paired odd and even field and detect 176 an interlacing artifact such as combing, which is the presence of horizontal streaks along the edge of an object in a scene resulting from translational differences between neighboring odd-even scan lines, usually caused by movement of the object in the scene from the time when the odd field was captured and the time when the even field was captured. The analyzer 170 outputs 178 the measure or degree of correlation between the detected 176 first feature (e.g. an artifact) and some estimated or actual population of progressive video in general, which population may include or relate to video content other than the video stream or content currently being processed. In other words, how strongly progressive video and the first feature are understood to be correlated. For example, if 90% of all non-progressive frames are known to exhibit the combing artifact then the analyzer 170 may output 178 information to that effect if it detects 176 a combing artifact in interlaced video fields in video buffer 106. The analyzer 170 could output 178 other correlation information if it detects 176 the lack of a combing artifact. For example, it may be known or estimated that 2% of a statistically significant population of progressive video fields do not have detectable combing artifacts. Because a frame is either true progressive or interlaced but not both, the discussion above about correlation to progressive video in general is equally applicable to non-progressive or interlaced video in general.

Analyzer 172 may detect 180 a second feature of the buffered video fields. The second feature is preferably a different type of feature than the first feature. The analyzer 172 outputs 182 information about how the detected 180 second feature correlates (or negatively correlates) with progressive video.

The inference calculator 146 receives 184 the outputs of the analyzers 170, 172, 174 and combines 186 them to determine an overall likelihood or probability that the video fields in the video buffer 106 are progressive. Per the overall probability, the inference calculator 146 outputs 188 a signal to the deinterlacer 108. The deinterlacer 108 has a selector 190 that directs the video in the video buffer 106 to a video deinterlacer 192 if the signal indicates that the video is not progressive. The selector 190 directs the video to the weave deinterlacer 194 if the signal indicates that the video is progressive.

A correlation history buffer 196 can be used to keep a rolling history of how one or more detected features have correlated with progressive video. A decision history 198 can be used to keep track of how frames have been categorized by the inference calculator 146. For example, the decision history 198 may keep track of whether each of the previous 20 frames were determined by the inference calculator 146 to be progressive or not. The history buffer 196 and decision history 198 can provide additional inputs to the inference calculator 146. For example, the inference calculator 146 may take into account not only the output of various field analyses but also the history of how frames have been classified. For example, it may be a strong indication that a current frame is progressive if the previous 20 frames have all been classified as progressive.

Figure 8:
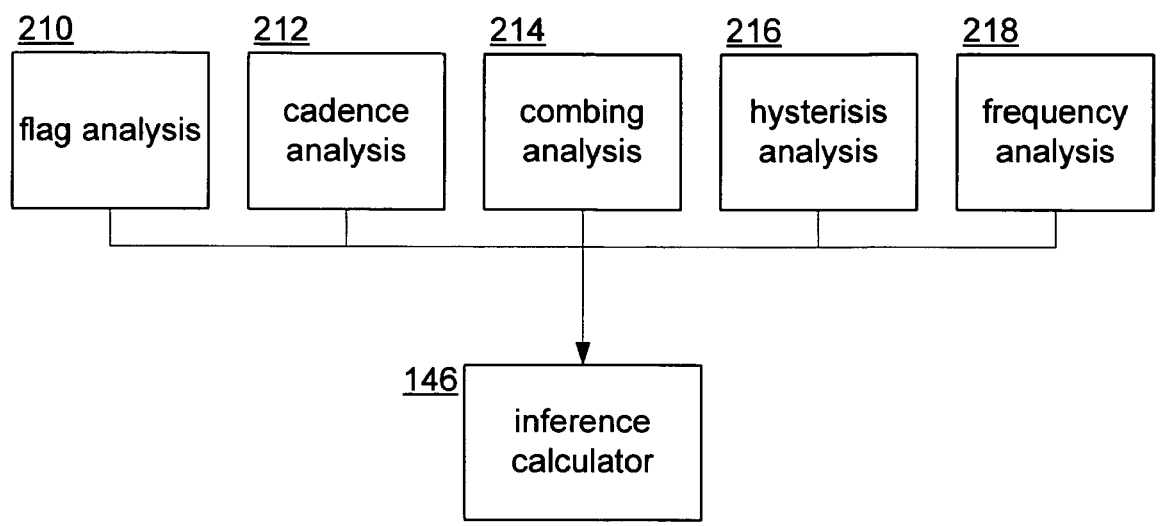
FIG. 8 shows some different types of analyzers.

FIG. 8 shows some different types of analyzers 210, 212, 214, 216, 218. These will be discussed in turn below. As mentioned above, many different types of analysis can be used to detect a variety of characteristics of video fields. An inference calculation can use any type of field analysis including analysis techniques not discussed herein; the idea of an inference calculation such as a Bayesian calculation to determine whether fields are progressive should not be considered to be limited to the various forms of progressivity analysis discussed herein.

A flag analysis module 210 analyzes flags 56 accompanying video fields. This technique has been discussed in the Background. Consider also the following. Any number of flags or flag patterns can be pre-correlated with progressive video. FIG. 9 shows a pattern table 230 with flag patterns 232, 234, 236 and corresponding probabilities that the patterns 232, 234, 236 are found in progressive or non-progressive frames. The flag patterns are only examples of MPEG2 flags. Other types of flags and other patterns can be used. If a sequence of four frames or fields in the video buffer 106 follow the pattern 232 and are flagged as progressive (TTTT), and are flagged to repeat the first field (TFTF), and are flagged as top field first (TFFT), then analyzer 210 would output 0.75, where 0.75 is the ratio of some arbitrary progressive video population (not necessarily the video subject to analysis) that has the same flag pattern 232. Such a video population may perhaps be estimated or automatically measured from a video database or by previous video playback by the subject device.

Some explanation of flags 56 may help understand how pattern table 230 works. For MPEG2 encoding/decoding, repeated fields (e.g. B1 and D2 in FIG. 1) are not actually stored twice. Instead, a flag is set to tell the decoder to repeat the field. The field C2 goes before field C1 and field D2 goes before field D1 because top (odd) and bottom (even) fields are sometimes required to alternate. However, because progressive-source fields are from the same film frame, the order doesn't matter. MPEG2 also has a flag to indicate when a frame is progressive, that is, to indicate when two fields come from the same instant in time. For film content, the progressive_frame flag should be true for every frame, but often it is not.

Further regarding pattern table 230, it should be noted that the actual correlation values may be obtained in any number of ways. The values could be estimates by video experts. The values could be obtained by scanning large amounts of video. The values could also be accumulated over time as part of a feedback mechanism. The idea is to produce some measure of how indicative an observed pattern is of progressive frames and/or non-progressive frames.

FIG. 10 shows another flag pattern 240. In this case the pattern is based on the progressive_frame flags in a previous, current, and next field/frame. The progressive flag of the current frame, the previous frame, and the next frame, this frame, the previous frame, and the next frame are analyzed together to come up with a probability. If all 3 are flagged progressive that is a strong indication, if the next and the previous ones are flagged progressive that is a moderate indication, if just the current field is flagged progressive that's a slightly less strong indication.

A cadence analyzer 212 may in some ways operate as discussed in the Background. A cadence analyzer 212 may look at the correlation of a current field and a previous like-parity field and/or a next like-parity field to obtain a correlation with a previous opposite-parity field or to obtain a correlation with a next opposite-parity field. The cadence analyzer 212 may look at 2 previous fields and 2 future fields (i.e., 2 odd fields or 2 even fields). In both cases correlation can be done using the sum of absolute differences calculation, the sum of squared differences calculation, or other image comparison techniques. Fields can be median-filtered to reduce noise before being compared. Furthermore, if the sum of absolute differences (e.g. abs(pixel 1−pixel 2) or sum of squared differences (abs(pixel1−pixel2)^2) is used it may help to discard some number of the highest and/or lowest values to reduce the influence of outlying data points caused by noise. As with the flag analysis, the cadence analyzer 212 may output an inference about what it observes. For example, the cadence analyzer 212 may output an indication that the observed cadence is strongly or weakly correlated with progressive type of video.

Fields may be judged for equality by comparing the two fields using a sum of absolute differences of a luma channel and assigning a set of probability estimates based on whether the number is above or below a constant K.

A combing analyzer 214 may also be used. Combing occurs with interlaced video sources and affects vertical lines during camera or object movement. When an interlaced capturing camera pans or when an object is moving during interlaced capture, the object will have moved a small distance between the odd field and the even field. The object will not line up precisely in the two fields and the edge of the object will be marred by vertical lines. The object may also appear to shimmer. How combing is detected is known and is adequately described elsewhere. Combing analyzer 214 may output probabilistic information about how a detected combing feature correlates with progressive and/or non-progressive video. The outputted probabilistic information, perhaps one or more ratios of progressive or non-progressive video that tests positively or negatively for combing, can be determined in advance based on testing, educated estimates, and so on.

A historical analyzer 216 also may provide correlative or predictive information to the inference calculator 146. The historical analyzer 216 may detect whether there is a pattern of previous frames that have been progressive. The historical analyzer may assign a weight by currency (with most recent frames being given more weight), and then may use that to determine how many previous fields have been the same, and if so what have they been. Previous progressive frames are a strong indication that the next frame is also progressive, but this indication should not be so strong that it cut off transitions to video that is actually non-progressive.

A frequency analyzer 218 may also contribute information for determining whether a frame is progressive. Frequency analysis refers to a correlation history (pattern matching on sets of correlations), for like fields and/or for unlike fields (similar to cadence analysis). The analysis is based on the contents of the correlation history buffer 196. The general idea is that a 3-2 pulldown signature, for example, if treated as a graph of the correlations between the current field and the next field, then a pattern like high-high-low-high-low-high-high-low-high-low may be expected. This can be compared against known patterns or a threshold (by dividing into high and low correlation buckets). It may be more effective to use a fast Fourier transform (FFT) to convert into the frequency domain, which will give a signature of peaks at certain frequencies for certain cadences. In the same way skip correlations can be used rather than field-to-field correlations (odds hlllhllll; evens similar llhll). Each of these can be a separate algorithm, one doing cadence analysis from the opposite parity field correlations. However, with opposite parity fields the lows are not going to be as low and the highs will not be as high. With like-field correlation the highs and lows will be a more pronounced but separate observation. Especially with an unlike-field correlation a really strong spike should be expected at a frequency of 5 fields; every 5th field is going to spike in a 3-2 pattern. With a 2-2 pattern skip correlation may not add any information, the regular hlhlhlh . . . pattern may be observed. Bayesian analysis allows both observations to be used effectively.

Figure 11:
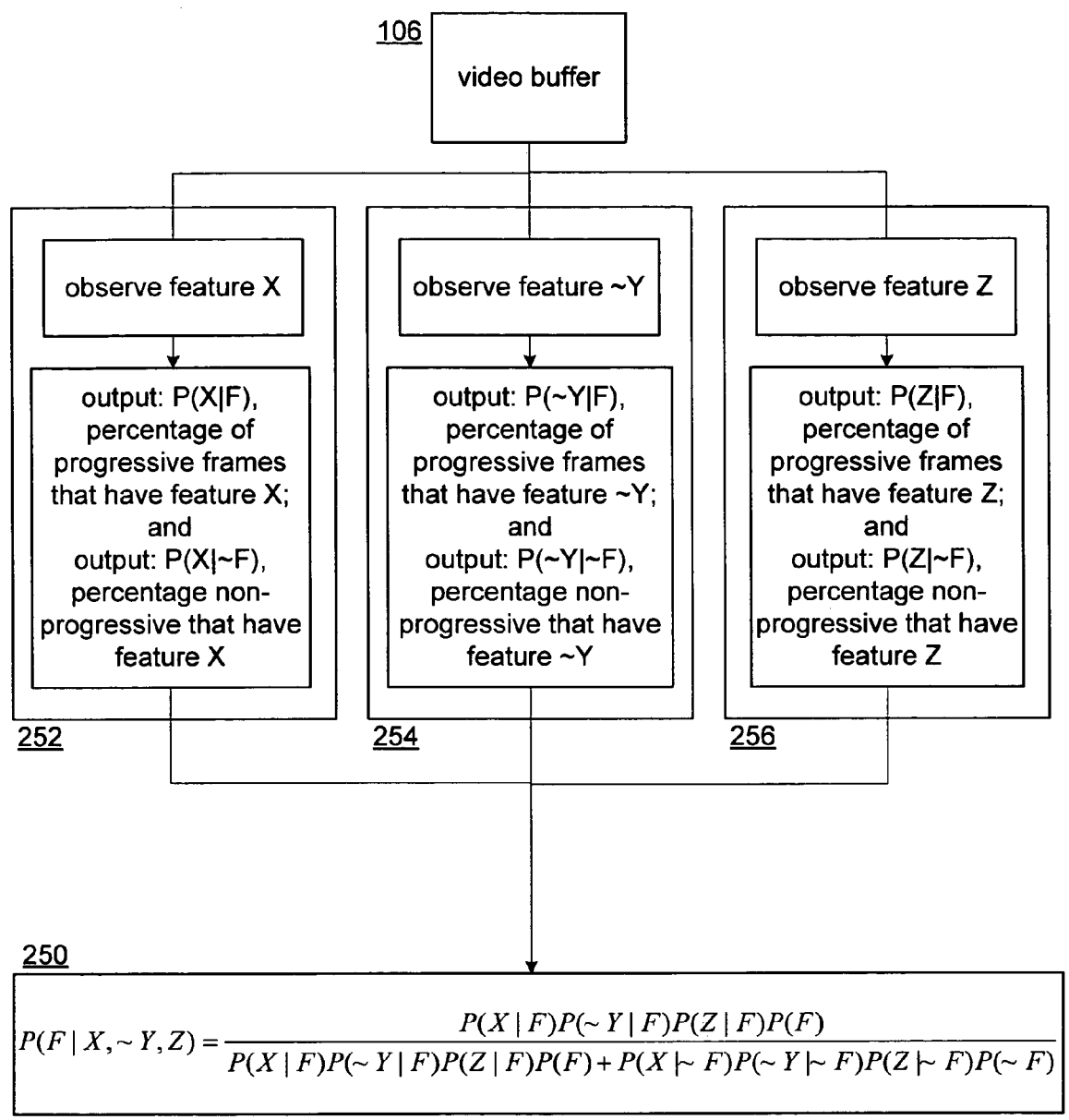
FIG. 11 shows a Bayesian embodiment of an inference calculator.

FIG. 11 shows a Bayesian embodiment of an inference calculator. The inference calculators discussed previously can be implemented using a Bayesian calculation. A Bayesian inference calculator 250 can compute a likelihood of progressiveness using the outputs of analyzers 252, 254, and 256. Analyzer 252 may observe feature X about the fields under consideration. The analyzer 252 may map the feature X to P(X|F), which is shorthand for the probability that feature X occurs given that a frame is progressive.

Given observations a, b, c, ..., the goal is to find a final probability P(F|a, b, c, ...), which is the probability that two fields being examined form a progressive frame given observations a, b, c ... Consider an a priori baseline probability P(F) that two fields will go together, without knowing anything about the observations a, b, c, ... This is simply a percentage of pairs of fields estimated to be progressive in some universe of video. Consider also an a priori probability P(~F), the probability of the two fields not forming a progressive frame, which is just 1−P(F), since the probability of (not F) plus the probability of (F) must add to 1. The observations a, b, c, ... could be, for example, the following:

X, the frame is flagged progressive;
~X, the frame is not flagged progressive;
Y, the two fields' similarity or correlation is greater than or equal to some constant K (estimated or empirical);
~Y, the fields' similarity is less than constant K;
Z, the previous set of fields was found to be progressive; and
~Z, the previous set of fields was not found to be progressive.

Suppose that observations X, ~Y, Z are gathered, that is, the frame is marked progressive, the two fields have a correlation less than constant K, and the previous set of fields was found to be progressive. Given these observations several probabilities may be found or estimated. Where P(a|b) means "The probability of a, given that b is true":

P(X|F), the percentage of progressive frames that are marked (correctly) progressive;
P(X|~F), the percentage of not-progressive frames that are marked (incorrectly) progressive;
P(~Y|F), the percentage of progressive frames that have a correlation below K;
P(~Y|~F), the percentage of not-progressive frames that have a correlation below K;
P(Z|F), the percentage of progressive frames that come immediately after another progressive frame; and
P(Z|~F), the percentage of not-progressive frames that come immediately after another progressive frame.

Generally these probabilities are estimated, but in some cases they can be gathered empirically by scanning large amounts of known progressive or known interlaced video. The final probability may be calculated as shown in the Bayesian inference calculator 250 in FIG. 11. The shown calculation is a basic or naïve Bayesian equation. The calculation is naïve because it assumes that the observations are completely independent. Although may not actually be true, the results are sufficient under this simplification. It is also possible to use a Bayesian network, which only requires some assumptions about how the observations are probabilistically interrelated.

It should be noted that although various embodiments herein have been discussed with reference to components such as analyzers, buffers, calculators, etc., these divisions are somewhat arbitrary. The general concepts can be realized with any arrangement of elements. Analyzers and an inference calculator need not be clearly separated to obtain the desired result. Furthermore, the elements and steps can be implemented using hardware, software, or combinations thereof. The variety of types of devices that can benefit from the identification of progressive video are too numerous to mention, but include at least DVD players, televisions and displays, personal computers, portable video players, codecs, etc.

In the case of a software implementation, a computer readable medium such as a CD-ROM, volatile or non-volatile memory, or other forms of storage may store information such as computer instructions or code for performing processes discussed herein. Such information can be information capable of being loaded and executed (e.g., executable code) or information in such storage while a program is executing (e.g., stack contents, CPU instructions, etc.).

The invention claimed is

1. A method of determining whether video fields form a progressive video frame, the method comprising:
   obtaining a plurality of probability observations, each observation being obtained using a different basis of analysis of the video fields; and
   combining the probability observations on a computer to determine whether the fields form a progressive video frame, wherein:
   the plurality of probability observations are obtained using at least a first basis of analysis and a second basis of analysis different from the first basis of analysis, and
   the first basis of analysis and the second basis of analysis each comprise a different one of flag analysis, cadence analysis, interlacing artifact analysis, hysteresis analysis, and cadence pattern frequency analysis.

2. A method according to claim 1, wherein the combining comprises a Bayesian calculation using the probability observations.

3. A method according to claim 2, wherein the Bayesian calculation comprises a Bayesian inference network or a naive Bayesian calculation.

4. A method according to claim 1, wherein one of the observations comprises comparing the two fields using a sum of absolute differences of a luma channel and assigning a set of probability estimates based on whether a result of the comparison is above or below a constant.

5. A method according to claim 4, wherein the sum of absolute differences is mapped to one of a plurality of ranges of possible values and a set of probability estimates is assigned based on which range the sum of absolute differences is mapped to, or wherein the sum of absolute differences is supplied to a set of polynomial equations that produces as output the set of probability estimates.

6. A method according to claim 1, wherein one of the observations comprises a comparison of the two fields using a sum of squared differences of a luma channel and assigning a set of probability estimates based on whether a result of the comparison is above or below a threshold.

7. A method according to claim 1, wherein the flag analysis comprises analyzing one or more of repeat-first field, top-field-first, and progressive-frame flags in a video stream.

8. A method according to claim 1, wherein the interlacing artifact analysis comprises combing detection.

9. A method according to claim 1, wherein either the first or the second basis of analysis comprises either analysis of a set of compression flags associated with previous and next fields in a sequence of frames, or analysis of a number of previous fields that have been previously found to be part of a progressive frame.

10. A method according to claim 1 of determining whether video fields form a progressive video frame, the method comprising:

obtaining a plurality of probability observations, each observation being obtained using a different basis of analysis of the video fields; and combining the probability observations on a computer to determine whether the fields form a progressive video frame, wherein;

the plurality of probability observations are obtained using at least a first basis of analysis and a second basis of analysis different from the first basis of analysis, and the first basis of analysis comprises analyzing video content of fields and the second basis of analysis comprises analyzing flags of frames.

11. A machine-readable storage medium storing information comprising executable instructions for performing a process, the process comprising:

automatically detecting the presence or absence of a first characteristic of one or more video fields;

automatically detecting the presence or absence of a second characteristic of the one or more video fields; and in accordance with the detecting, determining how likely or whether the two or more video fields form a progressive video frame based on a likelihood that fields of progressive or interlaced video frames in general have or do not have the first characteristic and based on a likelihood that fields of progressive or interlaced video frames in general have or do not have the second characteristic, wherein the first characteristic and the second characteristic each comprise a different one of a flag characteristic, a cadence characteristic, an interlacing artifact characteristic, a hysteresis characteristic, and a cadence pattern frequency characteristic.

12. A machine-readable storage medium according to claim 11, wherein the determination comprises a Bayesian inference using the likelihoods.

13. A machine-readable storage medium according to claim 12, further comprising comparing a likelihood of whether the video frame is a progressive video frame to a threshold.

14. A machine-readable storage medium according to claim 13, further comprising using the one or more fields to deinterlace the video frame when the threshold exceeds the likelihood.

15. A device for determining whether video fields form a progressive frame, where the device is configured to be capable of performing a process, the process comprising:

automatically analyzing the video fields and performing a Bayesian calculation based on the analyzing to determine whether the video fields form a progressive frame, wherein the analyzing comprises performing a first type of automatic analysis of the video fields, performing a second type of automatic analysis of the video fields, and wherein the Bayesian calculation is based on outputs of both analyses to determine whether the video fields form a progressive video frame.

16. A device according to claim 15, further comprising first analysis means for performing the first type of automatic analysis, and second analysis means for performing the second type of automatic analysis.

17. A device according to claim 15, wherein one of the observations is obtained by comparing the video fields using a sum of absolute differences of a luma channel.

18. A device according to claim 17, wherein the process further comprises assigning a set of probability estimates based on whether the sum of absolute differences is above or below a given threshold.

19. A device according to claim 15, further comprising a deinterlacing unit deinterlacing the video fields according to the determination of whether the video fields form a progressive frame.

20. A computer-readable storage medium storing executable computer instructions causing a computer to perform the method of claim 1.

* * * * *